United States Patent
Rapp et al.

(10) Patent No.: US 10,641,109 B2
(45) Date of Patent: May 5, 2020

(54) MASS OFFSET FOR DAMPING PERFORMANCE

(71) Applicant: UNITED TECHNOLOGIES CORPORATION, Hartford, CT (US)

(72) Inventors: Brandon M. Rapp, West Hartford, CT (US); Matthew Andrew Hough, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 1365 days.

(21) Appl. No.: 14/203,681

(22) Filed: Mar. 11, 2014

(65) Prior Publication Data

US 2015/0125304 A1    May 7, 2015

Related U.S. Application Data

(60) Provisional application No. 61/778,633, filed on Mar. 13, 2013.

(51) Int. Cl.
    *F01D 5/10*    (2006.01)
    *F01D 5/22*    (2006.01)
    *F01D 11/00*   (2006.01)

(52) U.S. Cl.
    CPC ............. *F01D 5/22* (2013.01); *F01D 11/008* (2013.01); *Y02T 50/671* (2013.01)

(58) Field of Classification Search
    CPC ......... F01D 5/22; F01D 5/3007; F01D 11/006
    USPC ................. 416/190, 193 R, 193 A, 248, 500
    See application file for complete search history.

(56) References Cited

U.S. PATENT DOCUMENTS

| | | | |
|---|---|---|---|
| 4,101,245 A * | 7/1978 | Hess | F01D 5/22 416/190 |
| 4,455,122 A * | 6/1984 | Schwarzmann | F01D 5/26 416/190 |
| 4,936,749 A | 6/1990 | Arrao et al. | |
| 5,052,890 A * | 10/1991 | Roberts | F01D 5/26 416/193 A |
| 5,228,835 A | 7/1993 | Chlus | |
| 5,281,097 A | 1/1994 | Wilson et al. | |
| 5,478,207 A * | 12/1995 | Stec | F01D 5/22 416/219 R |
| 5,785,499 A | 7/1998 | Houston et al. | |
| 5,803,710 A | 9/1998 | Dietrich et al. | |
| 5,827,047 A | 10/1998 | Gonsor et al. | |
| 6,042,336 A * | 3/2000 | Bulgrin | F01D 5/22 416/145 |
| 6,171,058 B1 * | 1/2001 | Stec | F01D 5/22 416/193 A |
| 6,267,557 B1 * | 7/2001 | Chin | F01D 5/22 416/190 |
| 7,021,898 B2 | 4/2006 | Elliott et al. | |
| 7,121,800 B2 | 10/2006 | Beattie | |
| 8,011,892 B2 | 9/2011 | Ramlogan et al. | |
| 8,322,990 B2 | 12/2012 | Hunt et al. | |

(Continued)

*Primary Examiner* — Reinaldo Sanchez-Medina
(74) *Attorney, Agent, or Firm* — Carlson, Gaskey & Olds, P.C.

(57) ABSTRACT

A gas turbine engine rotor assembly includes a plurality of blades spaced apart from each other for rotation about an axis. Each of the blades includes a platform having an inner surface and an outer surface. Adjacent platforms are separated from each other by a gap. A damper is positioned at an offset position within the gap to contact the inner surfaces of the adjacent platforms.

24 Claims, 4 Drawing Sheets

(56) References Cited

U.S. PATENT DOCUMENTS

| | | | |
|---|---|---|---|
| 9,279,332 B2* | 3/2016 | Zhang | F01D 5/26 |
| 2007/0286732 A1* | 12/2007 | Good | F01D 5/10 |
| | | | 416/190 |
| 2011/0262274 A1 | 10/2011 | Boy et al. | |
| 2013/0195665 A1* | 8/2013 | Snyder | F01D 5/22 |
| | | | 416/174 |

* cited by examiner

MASS OFFSET FOR DAMPING PERFORMANCE

CROSS-REFERENCE TO RELATED APPLICATION

This application claims priority to U.S. Provisional Application No. 61/778,633, filed Mar. 13, 2013.

BACKGROUND

Conventional gas turbine engines include a turbine assembly that has a plurality of turbine blades attached about a circumference of a turbine rotor. Each of the turbine blades is spaced a distance apart from adjacent turbine blades to accommodate movement and expansion during operation. Each blade includes a root that attaches to the rotor, a platform, and an airfoil that extends radially outwardly from the platform.

Hot gases flowing over the platform are prevented from leaking between adjacent turbine blades by a seal as components below the platform are generally not designed to operate for extended durations at the elevated temperatures of the hot gases. In addition to the seal, a damper is typically installed between adjacent turbine blades to dissipate potentially damaging vibrations.

Traditionally, the dampers are centered on the centerline of the blade-to blade gap between adjacent platforms. While these dampers have provided reduced vibrations, turbine engine manufacturers continue to seek further improvements to damper performance to reduce vibratory stresses even further without increasing weight.

SUMMARY

In a featured embodiment, a gas turbine engine rotor assembly includes a plurality of blades spaced apart from each other for rotation about an axis. Each of the blades includes a platform having an inner surface and an outer surface. Adjacent platforms are separated from each other by a gap. A damper is positioned at an offset position within the gap to contact the inner surfaces of the adjacent platforms.

In another embodiment according to the previous embodiment, adjacent blades define a blade-to-blade centerline, and wherein the damper is offset relative to the blade-to-blade centerline.

In another embodiment according to any of the previous embodiments, the damper is defined by a center of mass, and wherein the center of mass is offset from the blade-to-blade centerline.

In another embodiment according to any of the previous embodiments, the adjacent platforms are associated with adjacent blades, and wherein the damper provides a load split of approximately 60% for one of the adjacent blades and approximately 40% for the other of the adjacent blades.

In another embodiment according to any of the previous embodiments, the damper is positioned closer to one of the adjacent platforms than the other platform.

In another embodiment according to any of the previous embodiments, a rotor disk supports the plurality of blades, and each blade includes a root that fits into a corresponding slot in the rotor disk.

In another example embodiment, a gas turbine engine rotor assembly includes a rotor disk defining an axis of rotation and a plurality of blades supported by the rotor disk and spaced apart from each other for rotation about the axis of rotation. The plurality of blades includes at least a first blade having a first platform and a second blade having a second platform separated from the first platform by a gap. Each of the first and second platforms includes an inner surface and an outer surface. A damper is positioned at an offset position within the gap such that the damper provides an unequal load split between the first and second blades.

In another embodiment according to any of the previous embodiments, the damper provides a load split of approximately 60% for the first blade and approximately 40% for the second blade.

In another embodiment according to any of the previous embodiments, the first and second blades define a blade-to-blade centerline, and wherein the damper is offset relative to the blade-to-blade centerline.

In another embodiment according to any of the previous embodiments, the damper is defined by a center of mass, and wherein the center of mass is offset from the blade-to-blade centerline.

In another embodiment according to any of the previous embodiments, the damper provides a load split of approximately 60% for the first blade and approximately 40% for the second blade.

In another embodiment according to any of the previous embodiments, the damper is positioned closer to one of the adjacent platforms than the other platform.

In another embodiment according to any of the previous embodiments, the gap is defined by a circumferential width and a radial depth, and wherein the damper is defined by a center of mass that is positioned circumferentially closer to one of the first and second platforms than the other of the first and second platforms.

In another example embodiment, a gas turbine engine includes a compressor section and a turbine section downstream of the compressor section. The turbine section includes at least one turbine stage having a rotor disk defining an axis of rotation. A plurality of blades is supported by the rotor disk and the blades are spaced apart from each other for rotation about the axis of rotation. The plurality of blades includes at least a first blade having a first platform and a second blade having a second platform separated from the first platform by a gap. Each of the first and second platforms includes an inner surface and an outer surface. A damper is positioned at an offset position within the gap to contact the inner surface of the first platform and the inner surface of the second platform.

In another embodiment according to any of the previous embodiments, the damper provides an unequal load split between the first and second blades.

In another embodiment according to any of the previous embodiments, the damper provides a load split of approximately 60% for the first blade and approximately 40% for the second blade.

In another embodiment according to any of the previous embodiments, the first and second blades define a blade-to-blade centerline, and wherein the damper is offset relative to the blade-to-blade centerline.

In another embodiment according to any of the previous embodiments, the damper is defined by a center of mass, and wherein the center of mass is offset from the blade-to-blade centerline.

In another embodiment according to any of the previous embodiments, the damper provides a load split of approximately 60% for the first blade and approximately 40% for the second blade.

In another embodiment according to any of the previous embodiments, a fan section is provided, wherein the turbine section drives the fan section via a geared architecture.

BRIEF DESCRIPTION OF THE DRAWINGS

The disclosure can be further understood by reference to the following detailed description when considered in connection with the accompanying drawings wherein.

DETAILED DESCRIPTION

Figure 1:
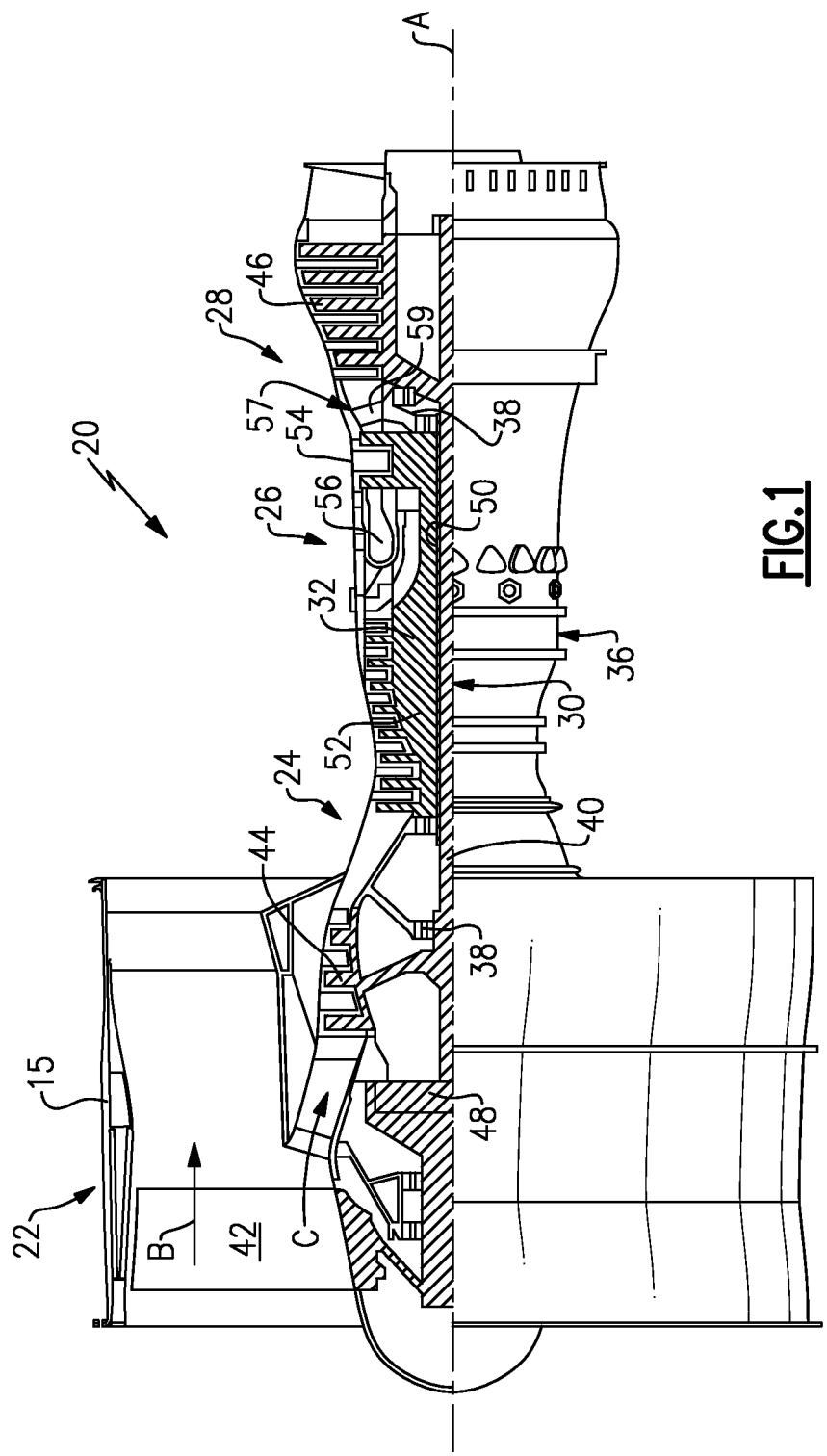
FIG. 1 schematically illustrates a geared turbofan engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFCT')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

Figure 2:
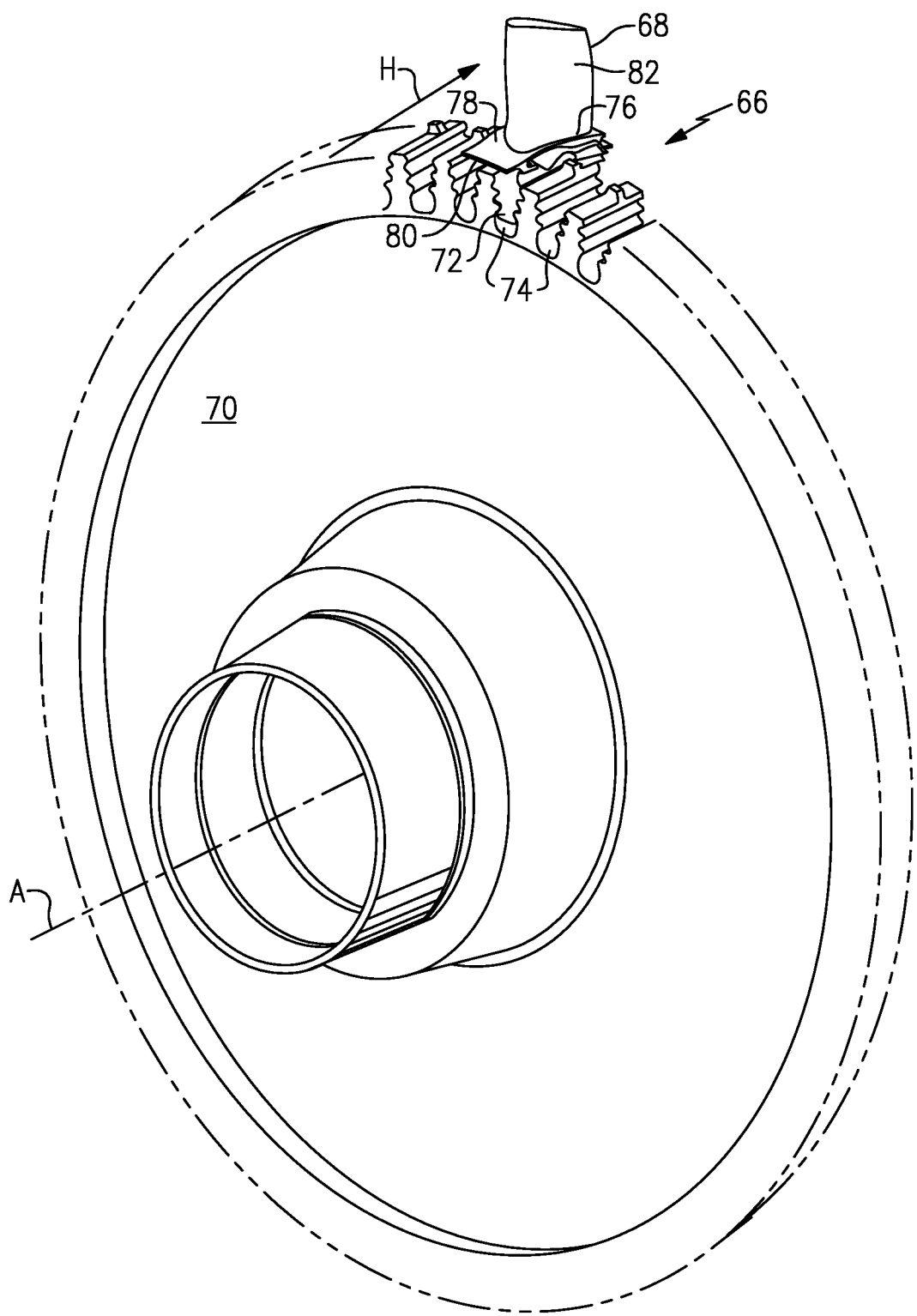
FIG. 2 illustrates a front perspective view of a blade mounted to a turbine disk.

The turbine section 28 includes one or more turbine rotor assemblies 66 as shown in FIG. 2. Each rotor assembly 66 includes a plurality of adjacent turbine blades 68 (only one is shown in FIG. 2) mounted to a turbine rotor disk 70 for rotation about the engine axis A. Each of the turbine blades 68 includes a root 72 that is fit into a corresponding slot 74 of the turbine rotor disk 70. Radially outward of the root 72 is a platform 76. The platform 76 defines an outer platform surface 78 and an inner platform surface 80. The inner surface 80 is disposed radially inward of the outer surface 78. An airfoil 82 extends outward from the platform 76.

Figure 3:
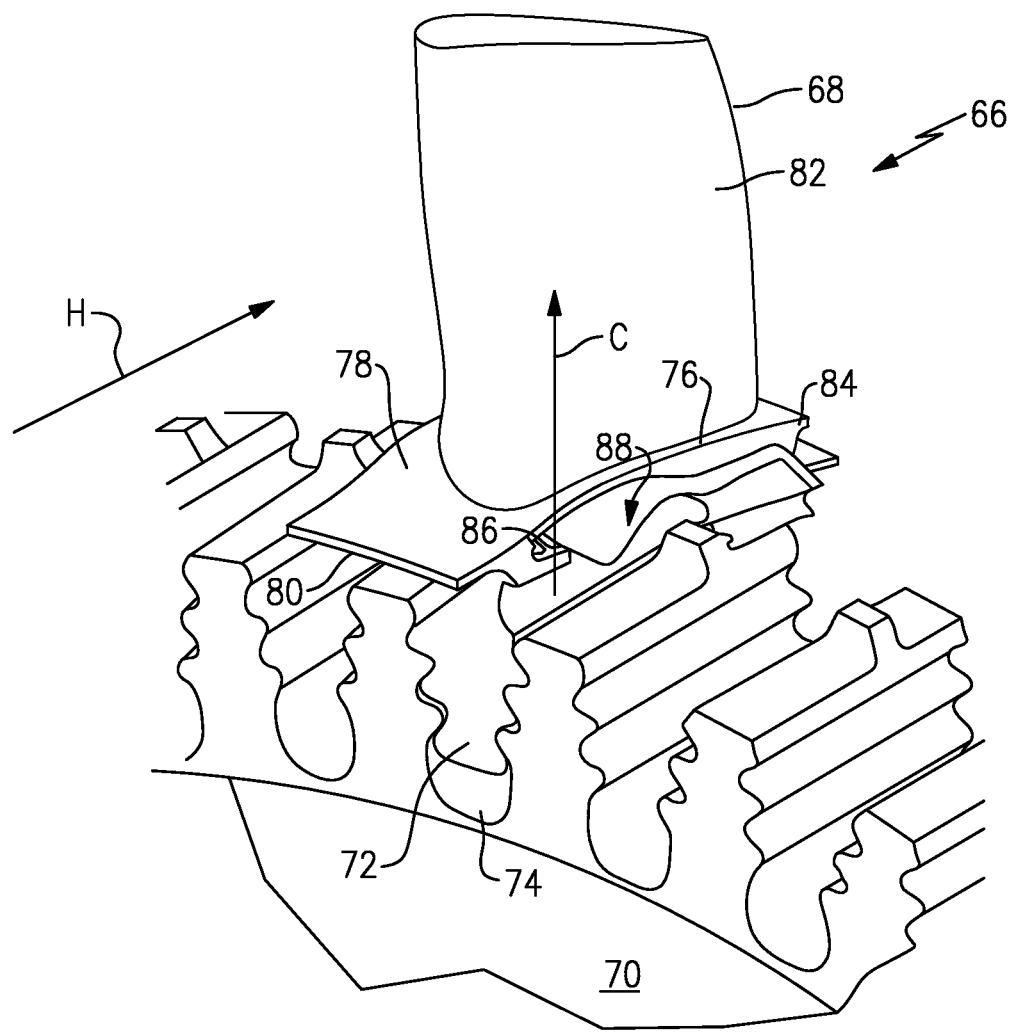
FIG. 3 is a perspective view of a portion of the turbine disk and blade of FIG. 2 which schematically shows a damper.
Figure 4:
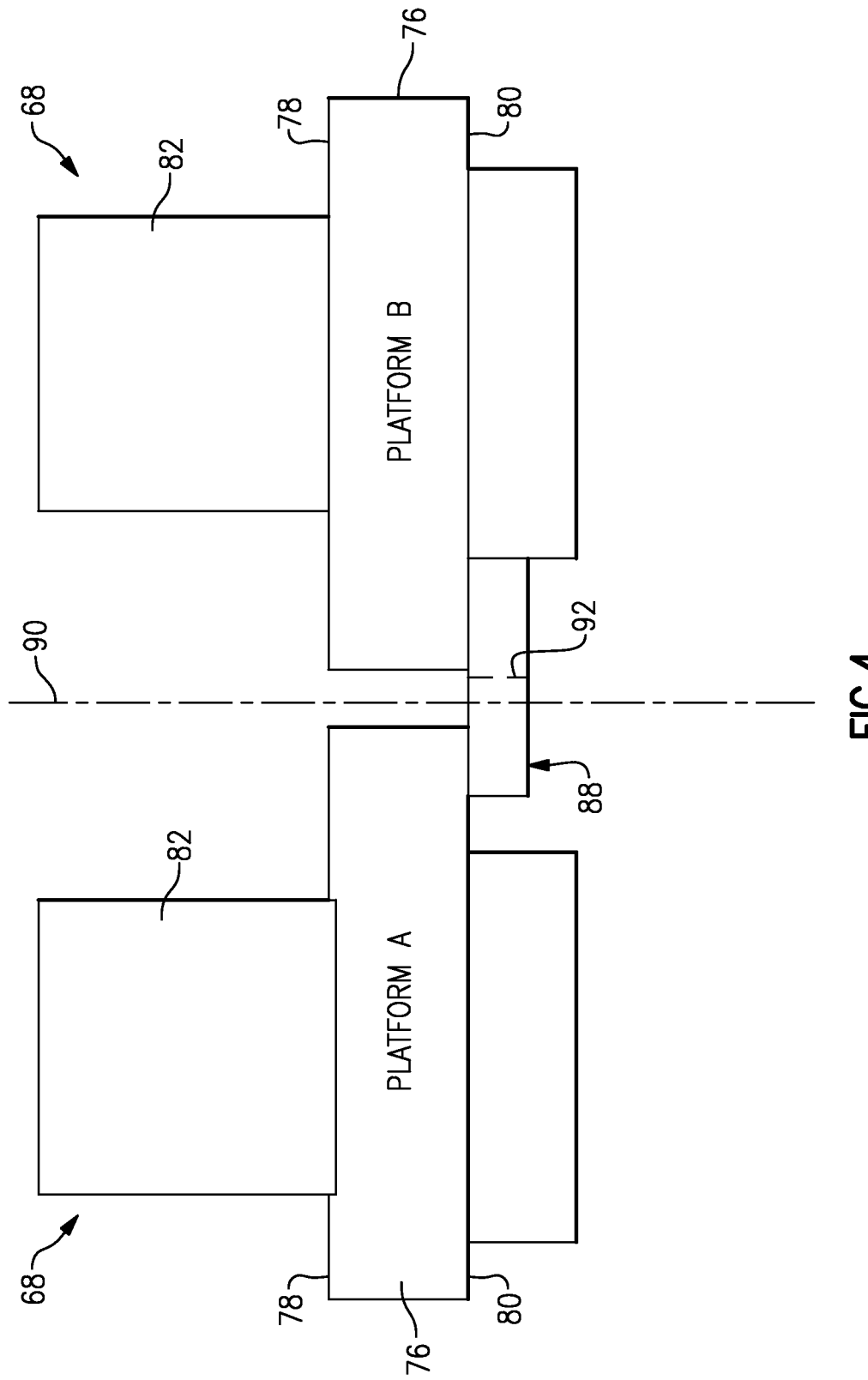
FIG. 4 schematically illustrates the damper as installed between two adjacent blades.

As shown in FIG. 3, hot gas H flows around the airfoil 82 and over the outer platform surface 78 while relatively cooler high pressure air (C) pressurizes a cavity 86 under the platform 76. A gap 84 extends axially between adjacent turbine blades 68 as best shown in FIG. 4. The gap 84 prevents contact and allows for thermal growth between adjacent turbine blades 68.

A damper 88 is positioned within the cavity 86 formed between adjacent turbine blades 12 (FIG. 4). The damper 88 abuts directly against both inner surfaces 80 of the adjacent platforms 76 and bridges the gap 84. The damper 88 provides dampening to reduce stresses introduced by vibrations. In one example configuration, the damper is positioned to extend to a greater extent underneath one platform than the other platform.

The damper 88 is sized to provide sufficient mass and rigidity or stiffness to dissipate vibration from the associated turbine blades 68. In the example shown, the damper 88 is positioned at an offset position within the gap 84 to contact the inner surfaces 80 of the adjacent platforms 76. The offset orientation allows the damper to retain the desired high stiffness level but with a smaller effective mass on surface 76 as compared to prior designs.

In one example, the adjacent blades 68 define a blade-to-blade centerline 90. The damper is positioned to be offset relative to the blade-to-blade centerline 90 as shown in FIG. 4. In one example, a range of offset is 0% to 80%, i.e. 20% remains under one platform. The damper 88 is defined by a center of mass, which is schematically indicated at 92. The center of mass 92 is offset from the blade-to-blade centerline 90. The damper 88 can have any of various shapes defined by various axial lengths, circumferential widths, and radial thickness. No matter what the shape or geometric configuration, each damper defines a damper center of mass 92 which is easily discernible by one of ordinary skill in the art. When the damper 88 is installed within in the cavity 86 to bridge the gap 84, the damper 88 should be positioned such that the blade-to-blade centerline 90 and damper center of mass 92 are not in alignment with each other.

The offset allows the damper 88 to provide an unequal load split between the adjacent blades 68. The leading blade carries a majority of the load. In one example, the load split is approximately 60% for one of the adjacent blades 68 and approximately 40% for the other of the adjacent blades 68. The 60% load on one of the blades provides sufficient fixed structural loading while the remaining 40% facilitates control of the damping. In the example shown in FIG. 4, the platform 76 on the left, i.e. platform A, would have the same stiffness but the mass exerted on platform A would be less than the mass exerted on the platform 76 on the right, i.e. platform B.

Shifting the damper center of mass off of the blade-to-blade centerline allows for decreased normal force, which allows for damping optimization in order to reduce vibratory stress in the blade. Prior designs straddled the blade-to-blade centerline, and the only way to optimize the mass of the damper was to affect the whole mass of the damper. The offset design allows the damper mass to stay the same, but by moving the center of mass off of the centerline the same effect is achieved as if the mass had been reduced.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine rotor assembly comprising:
   a plurality of blades spaced apart from each other for rotation about an axis, each of the blades including a platform having an inner surface and an outer surface, and wherein adjacent platforms are separated from each other by a gap; and
   a damper defined by a center of mass and positioned to have an outer surface that abuts directly against the inner surfaces of the adjacent platforms across the gap, and wherein a first portion of the outer surface of the damper contacts the inner surface of one of the adjacent platforms at a first edge of the gap and a second portion of the outer surface of the damper contacts the inner surface of the other of the adjacent platforms at a second edge of the gap that is opposite of the first edge of the gap such that the damper is in contact with the first and second edges while extending across the gap, and wherein the center of mass of the damper is aligned with the gap between adjacent platforms and is positioned closer to one of the adjacent platforms than the other of the adjacent platforms, and wherein the center of mass is offset from a centerline of the gap between adjacent platforms.

2. The gas turbine engine rotor assembly according to claim 1, wherein a range of offset of the center of mass is from greater than 0% up to 80%.

3. The gas turbine engine rotor assembly according to claim 2, wherein less than 20% of the damper remains under one of the adjacent platforms and up to 80% of the damper remains under the other of the adjacent platforms such that the damper provides an unequal load split between adjacent blades.

4. The gas turbine engine rotor assembly according to claim 1, wherein the inner surfaces of the adjacent platforms comprise contact surfaces that extend in a common direction such that the first portion of the outer surface of the damper contacts the contact surface of the one of the adjacent platforms at the first edge of the gap and the second portion of the outer surface of the damper contacts the contact surface of the other of the adjacent platforms at the second edge of the gap such that the damper provides an unequal load split between adjacent blades that comprises a first percentage for the first portion of the outer surface of the damper and a second percentage for the second portion of the outer surface of the damper wherein the first percentage is greater than the second percentage.

5. The gas turbine engine rotor assembly according to claim 4, wherein the first percentage is approximately 60% and wherein the second percentage is approximately 40%.

6. The gas turbine engine rotor assembly according to claim 1, wherein the damper provides an unequal load split between adjacent blades.

7. The gas turbine engine according to claim 1, including a rotor disk that supports the plurality of blades, and wherein each blade includes a root that fits into a corresponding slot in the rotor disk.

8. The gas turbine engine rotor assembly according to claim 1, wherein the gap is defined by a circumferential width and a radial depth, and wherein the center of mass of the damper is positioned circumferentially closer to one of the adjacent platforms than the other platform.

9. A gas turbine engine rotor assembly comprising:
a rotor disk defining an axis of rotation;
a plurality of blades supported by the rotor disk and spaced apart from each other for rotation about the axis of rotation, the plurality of blades including at least a first blade having a first platform and a second blade having a second platform separated from the first platform by a gap, and wherein each of the first and second platforms includes an inner surface and an outer surface; and
a damper defined by a center of mass and positioned to have an outer surface that abuts directly against the inner surfaces of the first and second platforms across the gap such that the center of mass is aligned with the gap between the first and second platforms and is positioned closer to one of the first and second platforms than the other of the first and second platforms so that the damper provides an unequal load split between the first and second blades, and wherein a first portion of the outer surface of the damper contacts the inner surface of one of the first and second platforms at a first edge of the gap and a second portion of the outer surface of the damper contacts the inner surface of the other of the first and second platforms at a second edge of the gap that is opposite of the first edge of the gap such that the damper is in contact with the first and second edges while extending across the gap, and wherein the center of mass is offset from a centerline of the gap between the first and second platforms.

10. The gas turbine engine rotor assembly according to claim 9, wherein the inner surfaces of the first and second platforms comprise contact surfaces that extend in a common direction such that the first portion of the outer surface of the damper contacts the contact surface of the one of the first and second platforms at the first edge of the gap and the second portion of the outer surface of the damper contacts the contact surface of the other of the first and second platforms at the second edge of the gap such that the damper provides an unequal load split that comprises a first percentage for the first portion of the outer surface of the damper and a second percentage for the second portion of the outer surface of the damper wherein the first percentage is greater than the second percentage.

11. The gas turbine engine rotor assembly according to claim 10, wherein the first percentage is approximately 60% for the first blade and the second percentage is approximately 40% for the second blade.

12. The gas turbine engine rotor assembly according to claim 9, wherein a range of offset of the center of mass is from greater than 0% up to 80%.

13. The gas turbine engine rotor assembly according to claim 12, wherein less than 20% of the damper remains under one of the first and second platforms and up to 80% of the damper remains under the other of the first and second platforms.

14. The gas turbine engine rotor assembly according to claim 9, wherein the damper provides a load split of approximately 60% for the first blade and approximately 40% for the second blade.

15. The gas turbine engine rotor assembly according to claim 9, wherein the gap is defined by a circumferential width and a radial depth, and wherein the center of mass is positioned circumferentially closer to one of the first and second platforms than the other of the first and second platforms.

16. A gas turbine engine comprising:
a compressor section; and
a turbine section downstream of the compressor section, the turbine section including
at least one turbine stage having a rotor disk defining an axis of rotation;
a plurality of blades supported by the rotor disk and spaced apart from each other for rotation about the axis of rotation, the plurality of blades including at least a first blade having a first platform and a second blade having a second platform separated from the first platform by a gap, and wherein each of the first and second platforms includes an inner surface and an outer surface; and
a damper defined by a center of mass and positioned to have an outer surface that abuts directly against the inner surfaces of the first and second platforms across the gap, and wherein the center of mass of the damper is aligned with the gap between the first and second and is positioned closer to one of the first and second platforms than the other of the first and second platforms, and wherein the inner surfaces of the first and second platforms comprise contact surfaces that extend in a common direction such that a first portion of the outer surface of the damper contacts the contact surface of one of the first and second platforms at a first edge of the gap and a second portion of the outer surface of the damper contacts the contact surface of the other of the first and second platforms at a second edge of the gap that is opposite of the first edge of the gap such that the damper is in contact with the first and second edges while extending across the gap.

17. The gas turbine engine according to claim 16 wherein the gap is defined by a circumferential width and a radial depth, and wherein the center of mass of the damper is positioned circumferentially closer to one of the first and second platforms than the other of the first and second platforms such that the damper provides an unequal load split between the first and second blades.

18. The gas turbine engine according to claim 17, the damper provides the unequal load split that comprises a first percentage for the first portion of the outer surface of the damper and a second percentage for the second portion of the outer surface of the damper wherein the first percentage is greater than the second percentage.

19. The gas turbine engine according to claim 18, wherein the first percentage is approximately 60% for the first blade and the second percentage is approximately 40% for the second blade.

20. The gas turbine engine according to claim 17, wherein the center of mass is offset from a centerline of the gap between the first and second platforms.

21. The gas turbine engine according to claim 10, wherein a range of offset of the center of mass is from greater than 0% up to 80%.

22. The gas turbine engine according to claim 21, wherein less than 20% of the damper remains under one of the first and second platforms and up to 80% of the damper remains under another of the first and second platforms.

23. The gas turbine engine according to claim 16, wherein the damper provides a load split of approximately 60% for the first blade and approximately 40% for the second blade.

24. The gas turbine engine according to claim 16, further comprising a fan section, wherein the turbine section drives the fan section via a geared architecture.

\* \* \* \* \*